(12) United States Patent
Cole et al.

(10) Patent No.: US 7,197,768 B2
(45) Date of Patent: *Mar. 27, 2007

(54) SOFTWARE MODEM FOR COMMUNICATING DATA USING ENCRYPTED DATA AND UNENCRYPTED CONTROL CODES

(75) Inventors: Terry L. Cole, Austin, TX (US); David W. Smith, Cedar Park, TX (US); Rodney Schmidt, Austin, TX (US); Geoffrey S. Strongin, Austin, TX (US); Brian C. Barnes, Round Rock, TX (US); Michael Barclay, Swallowcliffe (GB)

(73) Assignee: Advanced Micro Devices, Inc., Austin, TX (US)

( * ) Notice: Subject to any disclaimer, the term of this patent is extended or adjusted under 35 U.S.C. 154(b) by 991 days.

This patent is subject to a terminal disclaimer.

(21) Appl. No.: 09/901,329

(22) Filed: Jul. 9, 2001

(65) Prior Publication Data
US 2003/0009678 A1 Jan. 9, 2003

(51) Int. Cl.
*G06F 7/04* (2006.01)
*H04L 9/00* (2006.01)
*H04L 9/32* (2006.01)

(52) U.S. Cl. .................. 726/21; 713/152; 713/189; 713/194; 726/6; 380/266

(58) Field of Classification Search .............. 713/200, 713/201, 150, 151, 161, 202, 300, 152, 189, 713/194; 726/21, 6; 380/266
See application file for complete search history.

(56) References Cited

U.S. PATENT DOCUMENTS 4,041,398 A * 8/1977 Ellis ............................ 725/131
4,731,840 A * 3/1988 Mniszewski et al. ....... 380/284
5,185,797 A * 2/1993 Barrett et al. ............... 380/274

(Continued)

FOREIGN PATENT DOCUMENTS

WO     WO 00/22865      4/2000

OTHER PUBLICATIONS

Sadiku et al, Cable Modem Technology, 2000, IEEE, pp. 26-27.*

(Continued)

*Primary Examiner*—Christopher Revak
*Assistant Examiner*—Aravind K Moorthy
(74) *Attorney, Agent, or Firm*—Williams, Morgan & Amerson, P.C.

(57) ABSTRACT

A communications system includes a physical layer hardware unit and a processing unit. The physical layer hardware unit is adapted to communicate data over a communications channel. The physical layer hardware unit is adapted to receive unencrypted control codes and encrypted user data over the communications channel and transmit an upstream data signal over the communications channel based on the control codes. The processing unit is adapted to execute a software driver for interfacing with the physical layer hardware unit. The software driver includes program instructions for implementing a protocol layer to decrypt the user data and provide the upstream data to the physical layer hardware unit. A method for configuring a transceiver includes receiving unencrypted control codes over a communications channel; receiving encrypted user data over the communications channel; and transmitting an upstream signal over the communications channel based on transmission assignments defined by the control codes.

19 Claims, 3 Drawing Sheets

U.S. PATENT DOCUMENTS

| | | | | |
|---|---|---|---|---|
| 5,305,384 | A | * | 4/1994 | Ashby et al. .................. 380/29 |
| 5,319,792 | A | * | 6/1994 | Ehlig et al. .................. 712/228 |
| 5,412,730 | A | * | 5/1995 | Jones ........................... 380/46 |
| 5,511,069 | A | * | 4/1996 | England et al. ............. 370/276 |
| 5,784,633 | A | * | 7/1998 | Petty ............................ 710/60 |
| 5,787,483 | A | * | 7/1998 | Jam et al. .................... 711/158 |
| 5,925,114 | A | | 7/1999 | Hoang ......................... 710/48 |
| 5,953,324 | A | * | 9/1999 | Adachi ........................ 370/331 |
| 6,044,107 | A | * | 3/2000 | Gatherer et al. ............ 375/222 |
| 6,049,826 | A | * | 4/2000 | Beser .......................... 709/222 |
| 6,075,860 | A | * | 6/2000 | Ketcham ..................... 713/159 |
| 6,101,378 | A | * | 8/2000 | Barabash et al. ........... 455/406 |
| 6,119,228 | A | * | 9/2000 | Angelo et al. .............. 713/180 |
| 6,178,512 | B1 | * | 1/2001 | Fifield ........................... 726/1 |
| 6,212,360 | B1 | * | 4/2001 | Fleming et al. ............. 455/13.4 |
| 6,519,530 | B2 | * | 2/2003 | Crockett et al. ............ 701/300 |
| 6,549,568 | B1 | * | 4/2003 | Bingel ......................... 375/222 |
| 6,662,228 | B1 | * | 12/2003 | Limsico ....................... 709/225 |
| 6,697,421 | B1 | * | 2/2004 | Monroe et al. ............. 375/222 |
| 6,985,519 | B1 | * | 1/2006 | Barnes et al. ............... 375/220 |

OTHER PUBLICATIONS

McLoone et al, A Single-Chip IPSEC Cryptographic Processor, 2002, IEEE, pp. 133-138.*

Farrow, Rik, Critical Infrastructure Security and You, 2002, Network Magazine, pp. 66 and 68.*

Bertoni et al, About the Performances of the Advanced Encryption Standard in Embedded Systems with Cache Memory, 2003, IEEE, pp. 145-148.*

Schneier, Bruce, Applied Cryptography, 1996, John Wiley & Sons, Inc., Second Edition, pp. 1 and 2.*

International Search Report dated Oct. 30, 2002 (PCT/US02/18851; TT4041-PCT).

* cited by examiner

SOFTWARE MODEM FOR COMMUNICATING DATA USING ENCRYPTED DATA AND UNENCRYPTED CONTROL CODES

BACKGROUND OF THE INVENTION

1. Field of the Invention

This invention relates generally to modem communications and, more particularly, to a software modem for communicating data using encrypted data and unencrypted control codes.

2. Description of the Related Art

In recent years cellular telephones have become increasingly popular. A cellular telephone is one example of what is referred to as a "mobile station" or "mobile terminal." A mobile station can take on various forms other than a cellular telephone, including a computer (e.g., a notebook computer) with mobile communication capabilities.

Telecommunications services are provided between a cellular telecommunications network and a mobile station over an air interface, e.g., over radio frequencies. Typically, each subscriber having a mobile station is assigned a unique International Mobile Subscriber Identity (IMSI). At any moment, an active mobile station may be in communication over the air interface with one or more base stations. The base stations are, in turn, managed by base station controllers, also known as radio network controllers. A base station controller together with its base stations comprise a base station system. The base station controllers of a base station system are connected via control nodes to a core telecommunications network, such as the publicly switched telephone network (PSTN). One type of standardized mobile telecommunications scheme is the Global System for Mobile communications (GSM). GSM includes standards that specify functions and interfaces for various types of services. GSM systems may be used for transmitting both voice and data signals.

A particular base station may be shared among multiple mobile stations. Because the radio spectrum is a limited resource, the bandwidth is divided using combination of Time-Division and Frequency-Division Multiple Access (TDMA/FDMA). FDMA involves dividing the maximum frequency bandwidth (e.g., 25 MHz) into 124 carrier frequencies spaced 200 kHz apart. A particular base station may be assigned one or more carrier frequencies. Each carrier frequency is, in turn, divided into time slots. During an active session between the base station and the mobile station, the base station assigns the mobile unit a frequency, a power level, and a time slot for upstream transmissions from the mobile station to the base station. The base station also communicates a particular frequency and time slot for downstream transmissions from the base station destined for the mobile station.

The fundamental unit of time defined in GSM is referred to as a burst period, which lasts 15/26 ms (or approx. 0.577 ms). Eight burst periods are grouped into a TDMA frame (120/26 ms, or approx. 4.615 ms), which is the basic unit for the definition of logical channels. One physical channel is defined as one burst period per frame. Individual channels are defined by the number and position of their corresponding burst periods.

GSM frames, each frame having 8 burst periods, are grouped into superframes (e.g., groups of 51 frames) that include both traffic (i.e., voice or data signals) and control information. The control information is conveyed over common channels defined in the superframe structure. Common channels can be accessed both by idle mode and dedicated mode mobile stations. The common channels are used by idle mode mobile stations to exchange signaling information for changing to dedicated mode in response to incoming or outgoing calls. Mobile stations already in the dedicated mode monitor the surrounding base stations for handover and other information.

The common channels include:

- a Broadcast Control Channel (BCCH) used to continually broadcasts information including the base station identity, frequency allocations, and frequency-hopping sequences;
- a Frequency Correction Channel (FCCH) and Synchronization Channel (SCH) used to synchronize the mobile station to the time slot structure of a cell by defining the boundaries of burst periods, and the time slot numbering (i.e., every cell in a GSM network broadcasts exactly one FCCH and one SCH, which are, by definition, sent on time slot number 0 within a TDMA frame);
- a Random Access Channel (RACH) used by the mobile station to request access to the network;
- a Paging Channel (PCH) used to alert the mobile station of an incoming call; and
- an Access Grant Channel (AGCH) used to allocate a Stand-alone Dedicated Control Channel (SDCCH) to a mobile station for signaling (i.e., to obtain a dedicated channel) following a request on the RACH.

For security reasons, GSM data is transmitted in an encrypted form. Because a wireless medium can be accessed by anyone, authentication is a significant element of a mobile network. Authentication involves both the mobile station and the base station. A Subscriber Identification Module (SIM) card is installed in each mobile station. Each subscriber is assigned a secret key. One copy of the secret key is stored in the SIM card, and another copy is stored in a protected database on the communications network that may be accessed by the base station. During an authentication event, the base station generates a random number that it sends to the mobile station. The mobile station uses a random number, in conjunction with the secret key and a ciphering algorithm (e.g., A3), to generate a signed response that is sent back to the base station. If the signed response sent by the mobile station matches the one calculated by network, the subscriber is authenticated. The base station encrypts data transmitted to the mobile station using the secret key. Similarly, the mobile station encrypts data it transmits to the base station using the secret key. After a transmission received by the mobile station is decrypted, various control information, including the assigned power level, frequency, and time slot for a particular mobile station may be determined by the mobile station.

Generally, communication systems are described in terms of layers. The first layer, responsible for the actual transmission of a data carrying signal across the transmission medium, is referred to as the physical layer (PHY). The physical layer groups digital data and generates a modulated waveform based on the data in accordance with the particular transmission scheme. In GSM, the physical layer generates the transmission waveform and transmits during the assigned transmit time slot of the mobile station. Similarly, the receiving portion of the physical layer identifies data destined for the mobile station during the assigned receipt time slot.

The second layer, referred to as a protocol layer, processes digital data received by the physical layer to identify information contained therein. For example, in a GSM system, decryption of the data is a protocol layer function. Notice that changes in the operating parameters of the physical layer are identified only after decryption and processing by the protocol layer. Although this particular interdependency does not generally cause a problem in a purely hardware implementation, it may cause a problem when all or portions of the protocol layer are implemented in software.

Certain computer systems, especially portable notebook computers, may be equipped with wireless modems. One trend in modem technology involves the use of software modems that implement some of the real-time functions of traditional hardware modems using software routines. Because the hardware complexity of a software modem is less than a hardware counterpart, it is generally less expensive as well as more flexible. For example, the protocol layer decryption and processing may be implemented partially or entirely with software.

Software systems, such as PC systems, run interface control software in operating systems environments as software drivers. These drivers are responsible for communicating to the hardware devices and operate at a privileged level in the operating system. Other software applications are precluded from affecting the drivers. However, because drivers are not protected from other drivers, a variety of problems can occur that might affect the operation of a driver, such as by corrupting its operation. These effects may be caused accidentally, or may be caused by purposeful hacking. A corrupted (or co-opted) driver might cause additional problems outside the computer, such as causing a phone line or wireless channel to be used, operating an external peripheral, or deleting important data.

Because the operating parameters of the physical layer, which control the operation of the transmitter of the mobile station, are controlled by the protocol layer using software, it may be possible for a computer program or virus to take control of the mobile station and cause it to accidentally or purposefully transmit outside of its assigned time slot. A wireless communications network, such as a cellular network, relies on a shared infrastructure. A mobile station must adhere to the 'rules of the road' or it may cause interference on the network.

If certain functions of the mobile station are controlled in software, a programmer may determine how the GSM control frames are decoded and how the transmitter module is triggered. A virus may then be written and spread over the network to infiltrate the software-based mobile stations. Then, on a particular time and date, the virus could take direct control of the mobile station and transmit continuously or intermittently and inundate the base stations and other mobile units with random frequencies and full power. Such a virus design could enable and disable at random times to avoid detection, robbing the air-time supplier of some or all of his available bandwidth and may even cause a complete shutdown of the network. Such an attack may take only a few affected devices (i.e., as few as one) per cell to disable the cell completely.

The security problems associated with mobile stations operating in a shared infrastructure may be segregated into three levels of severity: tamper-proof, non-tamperproof, and class break. First, a hardware/firmware implementation (such as a cell-phone) is the hardest with which to tamper, because each device must be acquired individually and modified (i.e., tamper-proof). On the other hand, a software-based solution is easier to tamper with, as a hacker can concentrate on a software-only debugger environment (i.e., non-tamper-proof). Finally, a system with the ability to be tampered with that is similar on all systems and allows the tampering to be distributed to a large number of systems of the same type is susceptible to a 'class-break.'

A software wireless modem is susceptible not only to a class-break, but also it is among those devices whose code may be accessed from the same layer as IP (internet protocol) or another portable code access mechanism. Many software wireless modems may be integrated into computers coupled to networks or the Internet. Such an arrangement increases the susceptibility of the software to being tampered with and controlled.

Communication devices implementing other communications protocols using software may also be susceptible to some of the problems identified above, but to differing degrees and levels of consequence. For example, software drivers for communication devices using copper subscriber lines, such voice band modems (V.90), asymmetric digital subscriber line (DSL) modems, home phone line networks (HomePNA), etc., may be attacked, resulting in the subscriber line being disabled or improperly used. For example, a group of infected software modems may be used in a denial of service attack to continuously place calls to a predetermined number and overwhelm the destination. The software modem could also be used to prevent outgoing or incoming calls on the subscriber line or disrupt HomePNA traffic. Other wireless communication devices implemented in software, such as wireless network devices, could also be commandeered to disrupt traffic on the wireless network.

The present invention is directed to overcoming, or at least reducing the effects of, one or more of the problems set forth above.

SUMMARY OF THE INVENTION

One aspect of the present invention is seen in a communications system including a physical layer hardware unit and a processing unit. The physical layer hardware unit is adapted to communicate data over a communications channel. The physical layer hardware unit is adapted to receive unencrypted control codes and encrypted user data over the communications channel and transmit an upstream data signal over the communications channel based on the control codes. The processing unit is adapted to execute a software driver for interfacing with the physical layer hardware unit. The software driver includes program instructions for implementing a protocol layer to decrypt the user data and provide the upstream data to the physical layer hardware unit.

Another aspect of the present invention is seen in a method for configuring a transceiver the method includes receiving unencrypted control codes over a communications channel; receiving encrypted user data over the communications channel; and transmitting an upstream signal over the communications channel based on transmission assignments defined by the control codes.

BRIEF DESCRIPTION OF THE DRAWINGS

The invention may be understood by reference to the following description taken in conjunction with the accompanying drawings, in which like reference numerals identify like elements, and in which.

Figure 1:
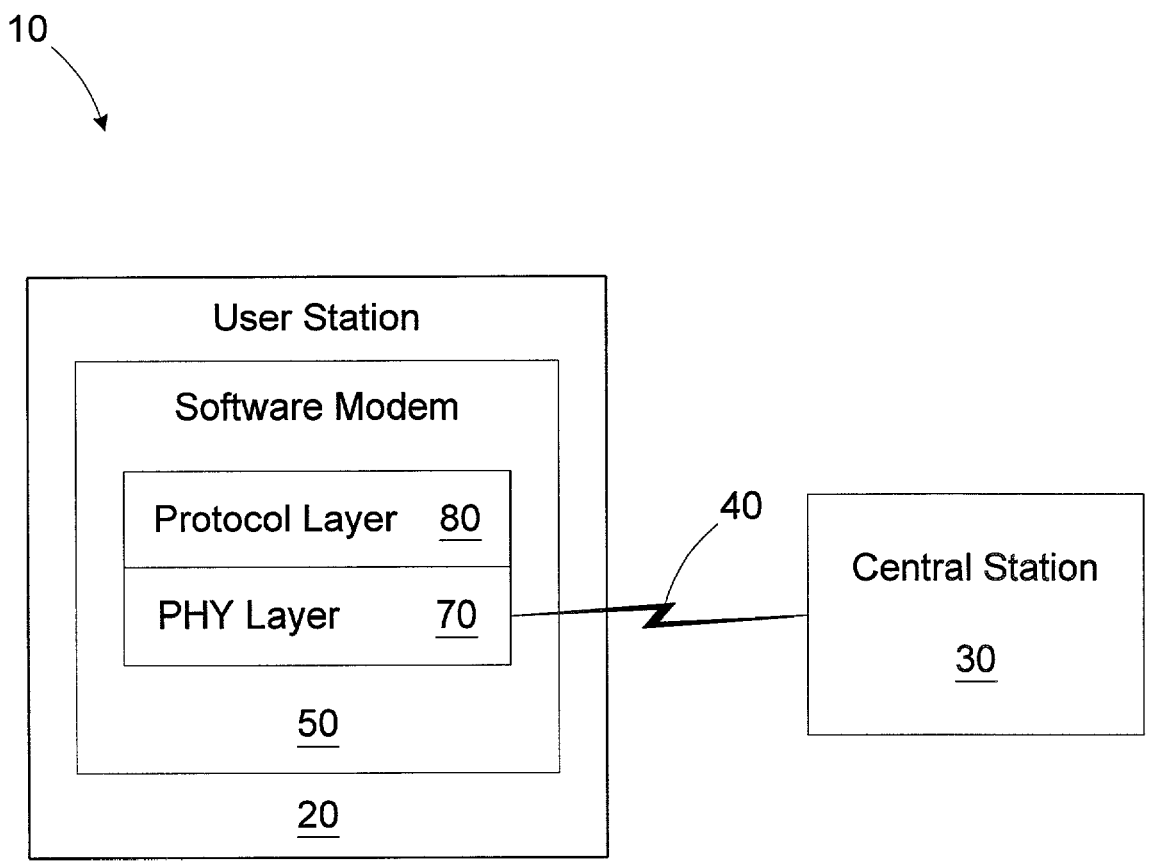
FIG. 1 is a simplified block diagram of a communications system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a block diagram of a communications system 10 is provided. The communications system 10 includes a user station 20 in communication with a central station 30 over a communication channel 40. In the illustrated embodiment, the user station 20 is a mobile computing device using a software modem 50 to communicate in accordance with a wireless communication protocol, such as GSM. The central station 30 may be a shared base station capable of serving a plurality of subscribers. Although the invention is described as it may be implemented in a wireless environment, its application is not so limited. The teachings herein may be applied to other communication environments using software implemented communication protocols (e.g., V.90, ADSL, HomePNA, Wireless LAN, etc.).

The user station 20 may comprise a variety of computing devices, such as a desktop computer, a notebook computer, a personal data assistant (PDA), etc. For purposes of illustration, the user station 20 is described as it may be implemented using a notebook computer. The software modem 50 may be installed as an internal resource. As will be appreciated by those of ordinary skill in the art, the software modem 50 includes a physical layer (PHY) 70 implemented in hardware and a protocol layer 80 implemented in software. For purposes of illustration, the functions of the software modem 50 are described as they might be implemented for a GSM communication protocol, although other protocols may be used.

The PHY layer 70 converts digital transmit signals into an analog transmit waveform and converts an incoming analog received waveform into digital received signals. For transmit signals, the output of the protocol layer 80 is the transmit "on-air" information modulated about a zero Hz carrier (i.e., a carrierless signal). The PHY layer 70 mixes (i.e., mixing may also be referred to as upconverting) the carrierless transmit signal generated by the protocol layer 80 in accordance with assigned time slot, frequency, and power level assignments communicated to the user station 20 by the central station 30 to generate the actual analog waveform transmitted by the PHY layer 70.

The central station 30 also communicates time slot and frequency assignments to the user station 20 for incoming data. The incoming analog receive waveform is sampled and downconverted based on the assigned time slot and frequency parameters to recreate a carrierless (i.e., modulated about zero Hz) receive waveform. The protocol layer 80 receives the carrierless receive waveform from the PHY layer 70 and performs baseband processing, decryption, and decoding to regenerate the received data.

Collectively, the time slot, frequency, and power level (i.e., for transmit data only) assignments are referred to as control codes. The particular algorithms used for implementing the software modem 50 are described by the particular industry standards (e.g., GSM standards) and are well known to those of ordinary skill in the art, so for clarity and ease of illustration they are not detailed herein, except as they are modified in accordance with the present invention.

In the communications system 10 of the instant invention, the central station 30 transmits user data in encrypted form and control codes in an unencrypted form. Such an arrangement protects the security of the user data to prevent eavesdropping, but allows the PHY layer 70 to directly read the control codes and configure its transceiver parameters without requiring processing by the protocol layer 80. Hence, if the protocol layer 80 is corrupted by a virus, it may not be commandeered to cause the software modem 50 to broadcast outside of its assigned time slot and frequency windows. A virus could deleteriously affect the operation of the infected unit, but it could not cause the infected unit to interfere with other users of the communications system 10. In such a manner, a class-break fault having the potential to disrupt or disable the communication system 10 is avoided.

There are numerous ways in which the encrypted user data and unencrypted control data may be segregated. A first exemplary technique includes encrypting the user bits prior to interleaving, while the bits associated with the control codes remain unencrypted. Subsequently, when the PHY layer 70 demodulates the incoming burst, it can identify those bits associated with the control codes and analyze them to determine an assigned power level, time slot, and frequency. When the PHY layer 70 receives data from the protocol layer 80 to be transmitted to the central station 30, it already "knows" the transmission parameters and transmits the upstream data according to its assignments. No interaction from the protocol layer 80 for determining the assigned transmit parameters is necessary. Likewise, for received data, the PHY layer 70 "knows" the time slots and frequency for receiving the data.

In another exemplary embodiment, described with reference to the simplified block diagram of the PHY layer 70 depicted in FIG. 2, the control codes are also transmitted in an unencrypted form, but they are transmitted as a separate signal that may be synchronized with the standard data-carrying signal. Because less data is transmitted with the control codes, a simpler transmission scheme may be possible. Other information carried on the control channels may still be included with the user data in the typical GSM format. However, the control channel information relating to the control codes is segregated.

Figure 2:
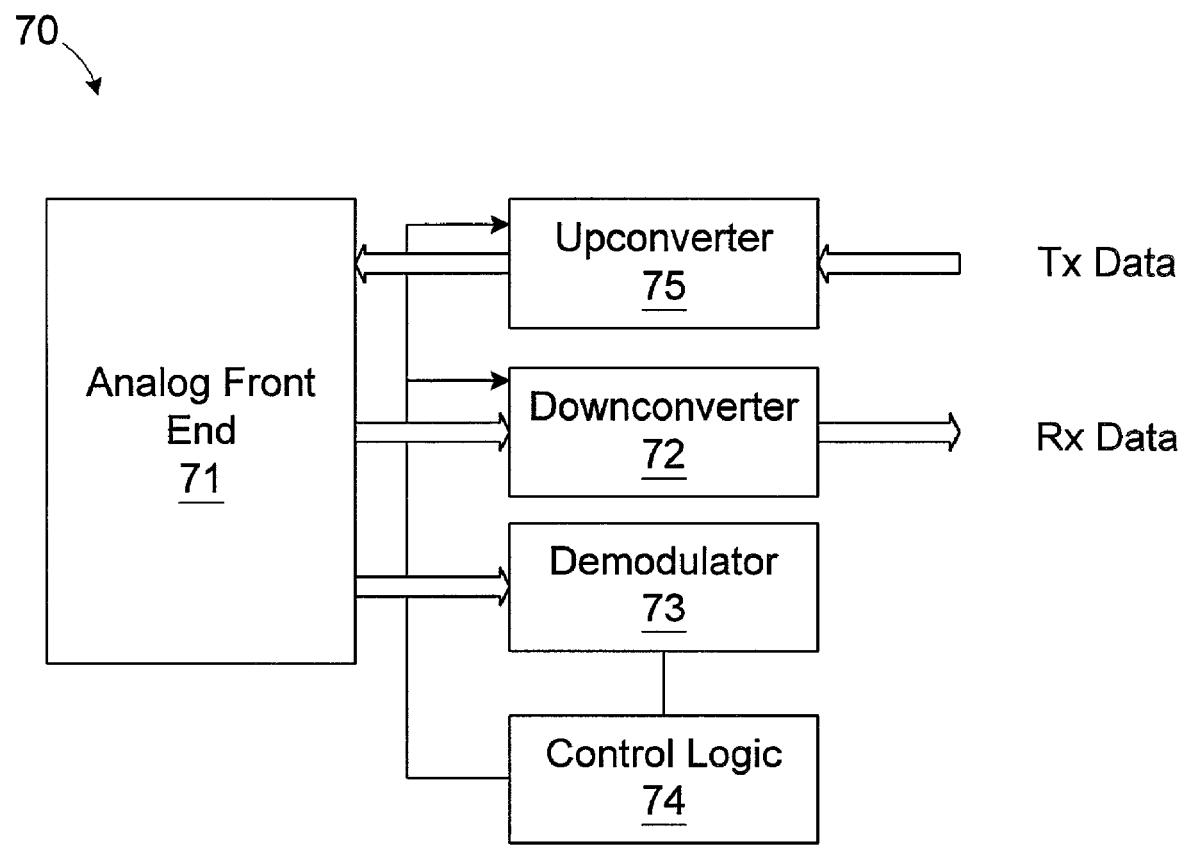
FIG. 2 is a simplified block diagram of a physical layer in a software modem if the communications system of FIG. 1.

As seen in FIG. 2, the PHY layer 70 includes a shared analog front end 71 for sampling the receive signal. Digital receive samples are provided to a downconverter 72 for generating a zero Hz modulated receive waveform, which is in turn passed to the protocol layer 80. The digital receive samples are also provided to a demodulator 73. The demodulator 73 detects a signal containing the control codes. Control logic 74 receives the control codes from the demodulator 73. For generating a transmit waveform, an upconverter 75 receives a digital transmit signal modulated about a zero Hz carrier from the protocol layer 80 and mixes the signal in accordance with the assigned transmit parameters. The control logic 74 configures the upconverter 75 to transmit the upstream data in accordance with the assigned power level, frequency, and time slots received in the signal processed by the demodulator 73. The control logic 74 also configures the downconverter 72 to receive incoming data at the assigned frequency and time slot.

There are numerous possible transmission schemes possible for sending the control code signal, depending on the specific implementation. For example, a simple frequency shift keying (FSK) or a simple quadrature amplitude modulation (QAM) technique may be used. The control channels may be addressed to particular phones and may use a simple message based protocol, such as a high level data link control (HDLC) technique, for example. Some messages within the control channel may not be amenable to a retransmit type of error protection, so a forward error control technique may also be employed.

Figure 3:
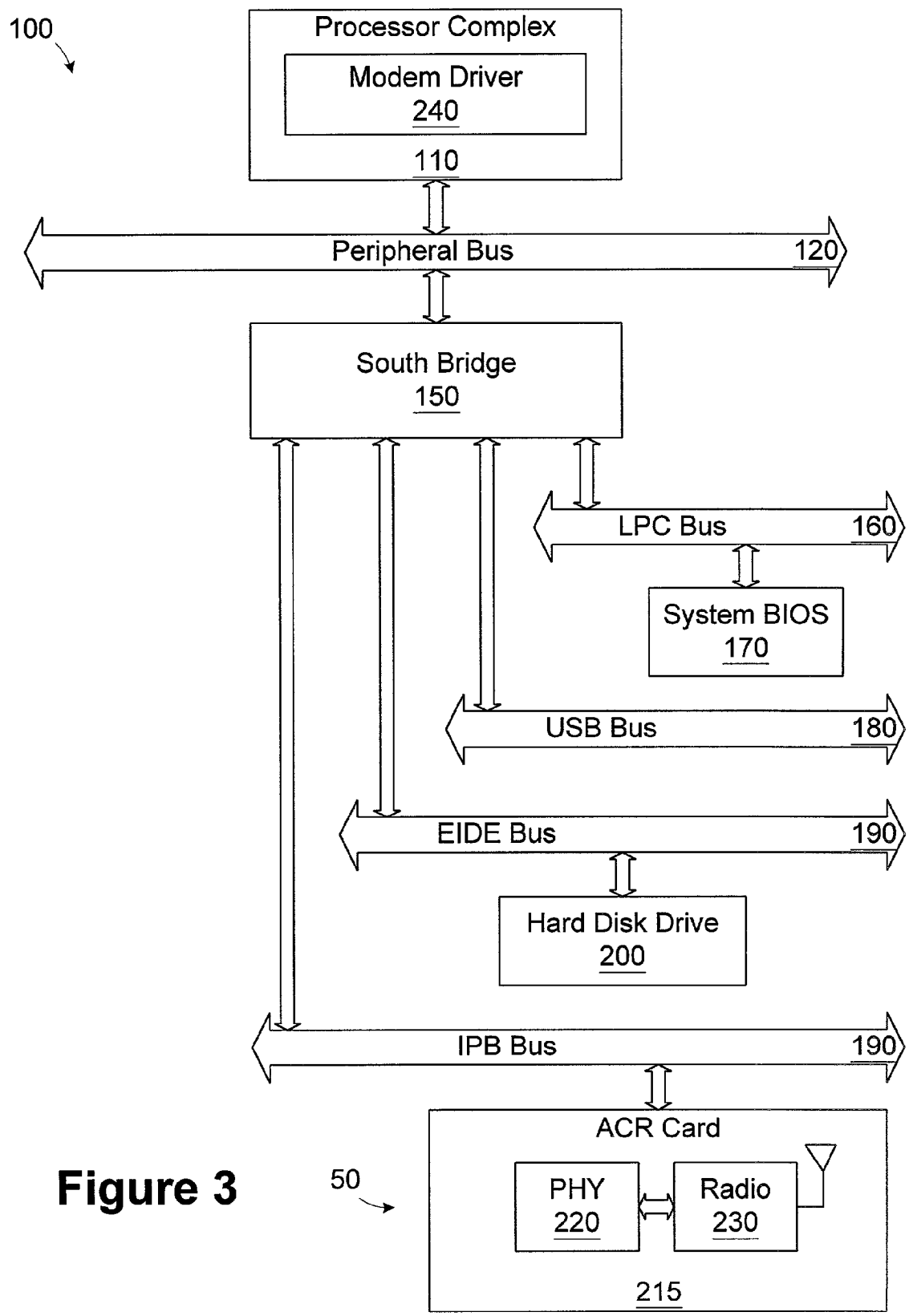
FIG. 3 is a simplified block diagram of an exemplary computer that embodies a user station in the communications system of FIG. 1.

Turning now to FIG. 3, a block diagram of the user station 20 embodied in a computer 100 is provided. The computer 100 includes a processor complex 110. For clarity and ease of understanding not all of the elements making up the processor complex 110 are described in detail. Such details are well known to those of ordinary skill in the art, and may vary based on the particular computer vendor and microprocessor type. Typically, the processor complex 110 includes a microprocessor, cache memories, system memory, a system bus, a graphics controller, and other devices, depending on the specific implementation.

The processor complex 110 is coupled to a peripheral bus 120, such as a peripheral component interface (PCI) bus. Typically a bridge unit (i.e., north bridge) in the processor complex 110 couples the system bus to the peripheral bus 120. A south bridge 150 is coupled to the peripheral bus 120. The south bridge 150 interfaces with a low pin count (LPC) bus 160 that hosts a system basic input output system (BIOS) memory 170, a universal serial bus (USB) 180 adapted to interface with a variety of peripherals (e.g., keyboard, mouse, printer, scanner, scanner) (not shown), an enhanced integrated drive electronics (EIDE) bus 190 for interfacing with a hard disk drive 200 and a CD-ROM drive (not shown), and an integrated packet bus (IPB) 210.

The IPB bus 210 hosts the hardware portion of the software modem 50. In the illustrated embodiment, the software modem 50 is hosted on an advanced communications riser (ACR) card 215. Specifications for the ACR card 215 and the IPB bus 210 are available from the ACR Special Interest Group (ACRSIG.ORG). The software modem 50 includes a PHY hardware unit 220 and a radio 230. In the illustrated embodiment, the radio 230 is adapted to transmit and receive GSM signals. Collectively, the PHY hardware unit 220 and the radio 230 form the PHY layer 70 (see FIG. 1).

The processor complex 110 executes program instructions encoded in a modem driver 240. Collectively, the processor complex 110 and the modem driver 240 implement the functions of the protocol layer 80 (see FIG. 1). The modem driver 240 performs the baseband processing necessary to reconstruct the user data from the received samples (i.e., deciphering, burst disassembling, de-interleaving, and speech decoding). However, because the PHY layer 70 has independently ascertained its transmission assignments, the software driver 240 needs only to pass upstream data to the PHY hardware unit 220 and receive incoming user data from the PHY hardware unit 220 as appropriate. The PHY hardware unit 220 is responsible for ensuring that the upstream data is only transmitted during the assigned time slot and at the assigned frequency. The PHY hardware unit 220 may also be adapted, based on its knowledge of the time slot assignments for incoming data, to transfer only those bursts associated with the assigned time slots to the modem driver 240. Transferring only the data received during the assigned time slots reduces the workload on the modem driver 240, thus freeing up resources in the processor complex 110 for other tasks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A communications system, comprising:
   a physical layer hardware unit adapted to communicate data over a communications channel, the physical layer hardware unit being adapted to receive unencrypted control codes and encrypted user data over the communications channel and transmit an upstream data signal over the communications channel based on the control codes; and
   a processing unit adapted to execute a software driver for interfacing with the physical layer hardware unit, the software driver including program instructions for implementing a protocol layer to decrypt the user data and provide the upstream data to the physical layer hardware unit.

2. The system of claim 1, wherein the control codes include at least one of a power level assignment, a frequency assignment, and a time slot assignment.

3. The system of claim 1, wherein the physical layer hardware unit includes:
   an analog front end adapted to sample a received signal over the communications channel to generate received signal samples;
   a downconverter adapted to process the received signal samples to generate a carrierless waveform including the user data; and
   a demodulator adapted to demodulate the received signal samples to generate the control codes.

4. The system of claim 3, wherein the physical layer hardware unit includes control logic adapted to receive the control codes and configure the downconverter based on the control codes.

5. The system of claim 4, wherein the control codes include at least one of a power level assignment, a frequency assignment, and a time slot assignment.

6. The system of claim 3, wherein the physical layer hardware unit includes:
   an upconverter adapted to receive the upstream data and generate an upstream digital signal, wherein the analog front end unit is further adapted to receive the upstream digital signal and generate the upstream data signal; and control logic adapted to receive the control codes and configure the upconverter based on the control codes.

7. The system of claim 1, wherein the processing unit comprises a computer.

8. The system of claim 7, wherein the computer includes:
a processor complex adapted to execute the program instructions in the software driver;
a bus coupled to the processor complex; and
an expansion card coupled to the bus, the expansion card including the physical layer hardware.

9. A modem, comprising a physical layer hardware unit adapted to communicate data over a communications channel, the physical layer hardware unit being adapted to receive unencrypted control codes and encrypted user data over the communications channel and transmit an upstream data signal over the communications channel based on transmission assignments defined by the control codes.

10. The modem of claim 9, wherein the control codes include at least one of a power level assignment, a frequency assignment, and a time slot assignment.

11. The modem of claim 9, wherein the physical layer hardware unit includes:
an analog front end adapted to sample a received signal over the communications channel to generate received signal samples;
a downconverter adapted to process the received signal samples to generate a carrierless waveform including the user data; and
a demodulator adapted to demodulate the received signal samples to generate the control codes.

12. The modem of claim 11, wherein the physical layer hardware unit includes control logic adapted to receive the control codes and configure the downconverter based on the control codes.

13. The modem of claim 12, wherein the control codes include at least one of a power level assignment, a frequency assignment, and a time slot assignment.

14. The modem of claim 11, wherein the physical layer hardware unit includes:
an upconverter adapted to receive the upstream data and generate an upstream digital signal, wherein the analog front end unit is further adapted to receive the upstream digital signal and generate the upstream data signal; and
control logic adapted to receive the control codes and configure the upconverter based on the control codes.

15. A method for configuring a transceiver, comprising:
receiving unencrypted control codes over a communications channel;
receiving encrypted user data over the communications channel; and
transmitting an upstream signal over the communications channel based on transmission assignments defined by the control codes.

16. The method of claim 15, wherein transmitting the upstream signal comprises transmitting the upstream signal based on at least one of a power level assignment, a frequency assignment, and a time slot assignment.

17. The method of claim 15, further comprising:
sampling a received signal over the communications channel to generate received signal samples;
downconverting the received signal samples to generate a carrierless waveform including the user data; and
demodulating the received signal samples to generate the control codes.

18. The method of claim 17, wherein downconverting the received signal samples to generate the carrierless waveform including the user data comprises downconverting the received signal samples based on the control codes.

19. A modem, comprising:
means for receiving unencrypted control codes over a communications channel;
means for receiving encrypted user data over the communications channel; and
means for transmitting an upstream signal over the communications channel based on transmission assignments defined by the control codes.

* * * * *